(12) United States Patent
Best

(10) Patent No.: US 7,123,157 B2
(45) Date of Patent: Oct. 17, 2006

(54) CAR-SEAT OCCUPIED BABY-ON-BOARD INDICATOR ALARM

(76) Inventor: Mark S. Best, 229 Laurel Ave., West Keansburg, NJ (US) 07734-3017

( * ) Notice: Subject to any disclaimer, the term of this patent is extended or adjusted under 35 U.S.C. 154(b) by 234 days.

(21) Appl. No.: 10/914,811

(22) Filed: Aug. 11, 2004

(65) Prior Publication Data

US 2006/0033634 A1   Feb. 16, 2006

(51) Int. Cl.
*G08B 21/00* (2006.01)
*H01H 35/00* (2006.01)
(52) U.S. Cl. ............... 340/666; 340/667; 200/85 A
(58) Field of Classification Search ............ 340/573.1, 340/686.1, 667, 666, 457; 200/85 A
See application file for complete search history.

(56) References Cited

U.S. PATENT DOCUMENTS

| 5,678,854 | A | * | 10/1997 | Meister et al. | ............... 280/735 |
| 6,104,293 | A | * | 8/2000 | Rossi | ...................... 340/573.1 |
| 6,998,988 | B1 | * | 2/2006 | Kalce | ...................... 340/573.1 |
| 2002/0149490 | A1 | * | 10/2002 | Butler et al. | ................ 340/667 |
| 2003/0122662 | A1 | * | 7/2003 | Quinonez | ................... 340/457 |
| 2003/0132838 | A1 | * | 7/2003 | Toles | .......................... 340/457 |

* cited by examiner

*Primary Examiner*—Daniel Wu
*Assistant Examiner*—Jennifer Mehmood
(74) *Attorney, Agent, or Firm*—Charles I. Brodsky

(57) ABSTRACT

With an infant or child placed in a child's car-seat in a motor vehicle, any rising of the driver from the driver's seat after the control apparatus of the invention has been energized, provides an alarm to alert the driver of leaving the infant or child unattended in the vehicle.

9 Claims, 1 Drawing Sheet

CAR-SEAT OCCUPIED BABY-ON-BOARD INDICATOR ALARM

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to children's car-seats, in general, and to the protection of infants and young children seated therein, in particular.

2. Description of the Related Art

There is almost nothing more tragic than the negligently caused death of an infant or young child—except, perhaps, where the death results from the carelessness of its own parent. As will be appreciated, more and more of these negligent deaths have recently been caused by a parent's forgetfulness in leaving the infant or child behind in a locked car during warm weather months. Understandably, no degree of remorse can bring the offspring back to life—and the degree of guilt felt by the forgetful parent is incalculable. Instances have in fact been reported in which the resulting death generated such feelings as to lead to the destruction of the parent's marriage, especially where it was so difficult for conception to take place, or for the child to be adopted to begin with.

SUMMARY OF THE INVENTION

As will become clear from the following description, the indicator alarm of the invention serves to provide an alert, preferably audible, when the driver's seat of a motor vehicle is vacated while a child's car-seat present in the vehicle is still occupied. In accomplishing this, a pair of weight-responsive electrical switches are utilized—the one for the driver's seat being actuated by a weight of at least 75 pounds (to accommodate small-sized drivers), while the switch for the child's car-seat is operative with a weight of at least 5 pounds.

Thus, and in accordance with the invention, the car-seat occupied Baby-on-Board indicator alarm of the invention includes a first weight-responsive electrical switch cooperative with a child's car-seat to close in the presence of a weight of at least a first predetermined amount placed therein, and otherwise biased to be opened. The indicator alarm also includes a second weight-responsive electrical switch cooperative with the driver's seat of a motor vehicle, to open in the presence of a weight of at least a second predetermined amount placed therein, and otherwise biased to be closed. Control apparatus is included within the motor vehicle, including a first electrical input coupled to the second switch, and a second electrical input coupled to a source of electrical power within the vehicle—which may comprise a 12 volt outlet of the vehicle, or a source of battery power included within the control apparatus. According to the invention, the control apparatus further includes a third electrical input coupled to the child's car-seat when inserted within the motor vehicle, along with means coupled with the first, second and third electrical inputs to provide an alarm when the first and second weight-responsive electrical switches are closed. In a preferred embodiment of the invention, the control apparatus is incorporated within a housing which may be positioned adjacent to the driver's seat of the motor vehicle, especially so that any audible alarm given can be heard.

As will be appreciated by those skilled in the art, the weight-responsive electrical switches can be included within individual ones of pads or mats respectively placed on the seat portion of each of the child's car-seat and the driver's seat. Alternatively, as part of an original manufacture, the weight-responsive electrical switches can be included within cushion portions of each of these seats. For a preferred construction, the electrical switch for the child's car-seat may be designed to close in the presence of a 5 pound infant, and to remain closed for as long as it remains in the seat—the same as for children of greater weight in the seat. For the driver's seat, on the other hand, the second weight-responsive electrical switch overcomes its initial closed-bias condition to open upon a 75 pound or greater weight remaining in the seat.

As will be understood, where the electrical power source for the alarm indicator operation is provided by the commonly found 12 volt outlet of the motor vehicle, the alarm is conditioned for operation whether or not the vehicle's ignition is turned "on". Once the driver rises from the seat, its switch-over to the open condition is defeated, its closed-bias condition returns—and if an infant or child of 5 pounds or more is still in the children's car-seat, an audible or other alert follows as an appropriate warning.

In this respect, the indicator alarm of the present invention provides an alert somewhat similar to the vehicle's sounding when the ignition is turned "off" with its lights still "on", or when the driver's door is opened with the keys still in the ignition. The alarm of the present invention, however, proves far more successful than prior art suggestions of placing toys in the front seat as indicative of the presence of a seated infant or child in the back, or a alternative suggestion of the driver's placing a briefcase, pocketbook, or bag of their own in the back alongside the car-seat as a reminder.

BRIEF DESCRIPTION OF THE DRAWING

These and other features of the present invention will be more clearly understood from a consideration of the following description taken in conjunction with the sole FIGURE of the Drawing which schematically illustrates the Baby-on-Board indicator alarm of the invention as is helpful in an understanding of its manner of operation.

DETAILED DESCRIPTION OF THE INVENTION

Figure 1:
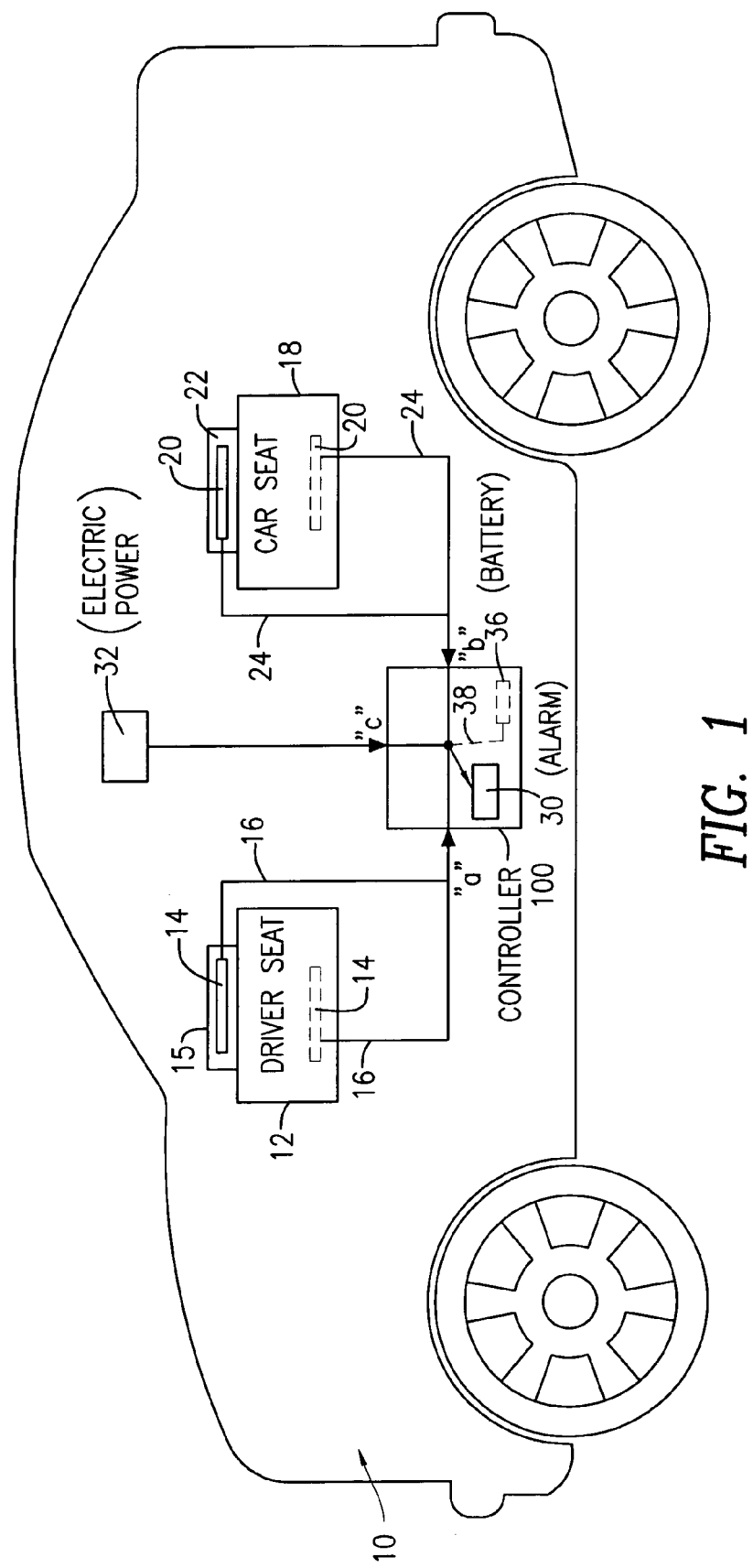

Reference numeral 10 in the Drawing partially illustrates interior portions of the cab of a motor vehicle as having a driver's seat 12 including a weight-responsive switch 14 biased to be closed when the seat 12 is unoccupied. As indicated, the switch 14 may be included in a pad or mat 15 externally placed onto the seat (the solid lines in the FIGURE), or may be internally included as part of the seat's overall construction (the dotted lines in the FIGURE). In either event, the electrical switch 14 is coupled by appropriate electrical wiring 16 to a first input "a" of a control apparatus 100, which has two other electrical inputs "b" and "c".

The child's car-seat to be placed within the cab 10 is shown at 18—and, as with the electrical switch 14 for the driver's seat 12, its electrical switch 20 may be included in a pad or mat 22 placed on the child's car-seat (the solid lines), or positioned internally as part of its original manufacture (the dotted lines). Comparable electrical wiring 24 couples electrical switch 20 to electrical input "b" of control apparatus 100.

As previously mentioned, and in accordance with the invention, the driver's seat electrical switch 14 is arranged to open in the presence of a weight of a prescribed amount placed in it, otherwise to be biased closed. Such prescribed weight may be as little as 75 pounds, for example, with an upper limit established by the strength and construction of the seat 12. For the child's car-seat switch 20, it, too, is initially biased, but to be "open", only to close in the presence of a weight of at least a lesser prescribed amount— for example, 5 pounds, the typical minimum weight of an infant when discharged from a hospital after birth. With the driver seated, then, and the infant in place, the driver's seat switch 14 is "open", and the child's car-seat switch is "closed".

In providing the indicator feature of the invention, an alarm 30 is included within the control apparatus 100, in electrical connection with the wirings 16 and 24 from the two switches 14 and 20. Also coupled with the alarm 30 is a source of electrical power—which may comprise the 12 volt outlet 32 accessible within the cab 10 (shown in solid lines) by means of electrical wiring 34, or which may comprise an internally housed battery 36 (shown in dotted construction), with its wire connection 38. Such electrical power, then joins with the couplings of the switches 14 and 20 to activate the alarm 30 when both switches 14 and 20 are "closed".

For example, with the 12 volt outlet from the cab portion of the motor vehicle, when both the child's car-seat and the driver's seat are unoccupied, the electrical circuit is incomplete, and the alert, as an audible alarm, does not sound. Placing an infant or child in the child's car-seat 18, on the other hand, closes the child's car-seat switch 20—which would then complete the circuit with the initially biased driver's seat switch 14, except for the fact that the electrical power source has yet to be activated. Upon the driver sitting on the seat 14, such action breaks its initial biased closed state, so that connecting the electrical power source then does nothing. However, with the power applied and with the child or infant seated, any subsequent getting up by the driver reverts the driver's seat switch 14 back to its initial "closed" condition, to complete the circuit in sounding the alarm. In other words, once the parent places the child in the child's car-seat, enters the driver's seat himself/herself and then connects the electrical power to the control apparatus 100 (by the 12 volt outlet or switching on the battery 36), any later rising of the driver completes the circuit and the alarm indication is given. In such manner, the driver is immediately informed by the alarm of the continuing presence of the infant or child in the child's car-seat. Remedial action can then be taken to insure that the infant or child is not left there, in protecting the child against rising temperatures in the motor vehicle.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the invention.

I claim:

1. A Baby-on-Board indicator alarm comprising:
    a first weight-responsive electrical switch cooperative with a child's car-seat to close in the presence of a weight of at least a first predetermined amount placed therein, and otherwise biased to be open;
    a second weight-responsive electrical switch cooperative with a driver's seat of a motor vehicle to open in the presence of a weight of at least a second predetermined amount placed therein, and otherwise biased to be closed; and
    control apparatus within said motor vehicle including a first electrical input coupled to said second switch and a second electrical input coupled to a source of electrical power within said vehicle;
    with said control apparatus also including a third electrical input coupled to said car-seat when inserted within said motor vehicle, and means coupled with said first, second and third electrical inputs for providing an alarm when said first and second weight-responsive electrical switches are closed in said vehicle.

2. The indicator alarm of claim 1 wherein said source of electrical power comprises a 12 volt outlet within said motor vehicle.

3. The indicator alarm of claim 1 wherein said source of electrical power includes a battery included within said control apparatus.

4. The indicator alarm of claim 1 wherein said means provides an audible alert when said first and second electrical switches are closed.

5. The indicator alarm of claim 1 wherein said control apparatus is incorporated within a housing adjacent to the driver's seat of said motor vehicle.

6. An indicator alarm of claim 1 wherein each of said first and second weight-responsive electrical switches are included within individual ones of pads and mats respectively placed on a seat portion of each of said child's car-seat and said driver's seat within said motor vehicle.

7. The indicator alarm of claim 1 wherein each of said first and second weight-responsive electrical switches are included within cushion portions of each of said child's car-seat and said driver's seat within said motor vehicle.

8. The indicator alarm of claim 6 wherein said control apparatus is incorporated within a housing adjacent to the driver's seat of said motor vehicle.

9. The indicator alarm of claim 8 wherein said first weight-responsive electrical switch cooperates with said child's car-seat to close upon the placement therein of a weight at least as great as 5 pounds, and wherein said second weight-responsive electrical switch cooperates with said driver's seat to open upon the placement of weight at least as great as 75 pounds when placed therein.

* * * * *